United States Patent
Huang et al.

(10) Patent No.: US 9,098,773 B2
(45) Date of Patent: Aug. 4, 2015

(54) SYSTEM AND METHOD OF DETECTING OBJECTS IN SCENE POINT CLOUD

(71) Applicants: University of Southern California, Los Angeles, CA (US); Chevron U.S.A. Inc., San Ramon, CA (US)

(72) Inventors: Jing Huang, Los Angeles, CA (US); Suya You, Arcadia, CA (US); Amir Anvar, Houston, TX (US); Christopher Lee Fisher, Houston, TX (US)

(73) Assignees: CHEVRON U.S.A. INC., San Ramon, CA (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 215 days.

(21) Appl. No.: 13/929,280

(22) Filed: Jun. 27, 2013

(65) Prior Publication Data

US 2015/0003723 A1  Jan. 1, 2015

(51) Int. Cl.
*G06K 9/00* (2006.01)
*G06K 9/62* (2006.01)
*G06T 7/00* (2006.01)

(52) U.S. Cl.
CPC .............. *G06K 9/6212* (2013.01); *G06K 9/628* (2013.01); *G06K 9/6256* (2013.01); *G06T 7/0097* (2013.01)

(58) Field of Classification Search
USPC ......... 382/154, 156, 157, 159, 190, 224, 305; 345/419, 653, 664, 679
See application file for complete search history.

(56) References Cited

U.S. PATENT DOCUMENTS

| | | | |
|---|---|---|---|
| 7,317,456 B1* | 1/2008 | Lee ................................ | 345/427 |
| 8,639,214 B1* | 1/2014 | Fujisaki ......................... | 455/406 |
| 8,732,118 B1* | 5/2014 | Cole et al. ..................... | 707/607 |
| 8,792,969 B2* | 7/2014 | Bernal et al. .................. | 600/476 |
| 8,867,807 B1* | 10/2014 | Fram ............................ | 382/128 |
| 8,938,416 B1* | 1/2015 | Cole et al. ..................... | 707/607 |
| 8,941,644 B2* | 1/2015 | Zhu et al. ...................... | 345/419 |

OTHER PUBLICATIONS

Chang, et al. LIBSVM: A Library for Support Vector Machines, Initial Version 2011, updated Mar. 4, 2013, and online at www.csie.ntu.edu.tw/~cjlin/libsvm, Department of Computer Science, National Taiwan University, Taipei, Taiwan, 39 pages.

(Continued)

*Primary Examiner* — Yosef Kassa
(74) *Attorney, Agent, or Firm* — Pillsbury Winthrop Shaw Pittman, LLP

(57) ABSTRACT

A system and method of detecting one or more objects in a three-dimensional point cloud scene are provided. The method includes receiving a three-dimensional point cloud scene, the three-dimensional point cloud scene comprising a plurality of points; classifying at least a portion of the plurality of points in the three-dimensional point cloud into two or more categories by applying a classifying-oriented three-dimensional local descriptor and learning-based classifier; extracting from the three-dimensional point cloud scene one or more clusters of points utilizing the two or more categories by applying at least one of segmenting and clustering; and matching the extracted clusters with objects within a library by applying a matching-oriented three-dimensional local descriptor.

20 Claims, 8 Drawing Sheets

(56) References Cited

OTHER PUBLICATIONS

Rusu, et al, Fast Point Feature Histograms ("FPFH) for 3D Registration, IEEE International Conference on Robotics and Automation (ICRA), Kobe, Japan, May 12-17, 2009, 6 pages.

Huang, et al., Point Cloud Matching based on 3D Self-Similarity, International Workshop on Point Cloud Processing (Affiliated with CVPR 2012), Jun. 16, 2012, Providence, Rhode Island, Jun. 16, 2012.

* cited by examiner

SYSTEM AND METHOD OF DETECTING OBJECTS IN SCENE POINT CLOUD

BACKGROUND

1. Field

The present invention relates to a system and method of detecting objects in scene point clouds.

2. Background

Object detection is one of the most basic tasks in computer vision. Numerous techniques focused on detection of humans, human faces, cars, ships, daily life objects, etc. Until recently, however, most techniques were only limited to two-dimensional (2D) image data. With the development of sensor technology in recent years, three-dimensional (3D) point clouds of real scenes have been increasingly popular and precise. However, very few methods that directly detect objects from 3D point clouds are presently available.

Conventional point cloud processing can be divided into several categories based on their focus: segmentation, classification, matching, modeling, registration and detection. Object detection in the scene point cloud is a systematic work that typically requires multiple techniques in different aspects. Various point cloud processing have been applied to various forms of data such as detection of vehicles, poles and other outdoor objects in urban scenes, detection/classification of chairs, tables and other indoor objects in the office scenes, etc. None of the conventional point cloud processing has been implemented in industrial scene point clouds, which may include complex object shapes and a complex arrangement of the objects in a scene.

SUMMARY

An aspect of an embodiment of the present invention is to provide a method of detecting one or more objects in a three-dimensional point cloud scene. The method includes receiving a three-dimensional point cloud scene, the three-dimensional point cloud scene comprising a plurality of points; classifying at least a portion of the plurality of points in the three-dimensional point cloud into two or more categories by applying a classifying-oriented three-dimensional local descriptor and learning-based classifier; extracting from the three-dimensional point cloud scene one or more clusters of points utilizing the two or more categories by applying at least one of segmenting and clustering; and matching the extracted clusters with objects within a library by applying a matching-oriented three-dimensional local descriptor.

Another aspect of an embodiment of the present invention includes a system of detecting one or more objects in a three-dimensional point cloud scene. The system includes a processor configured to: (a) receive a three-dimensional point cloud scene, the three-dimensional point cloud scene comprising a plurality of points; (b) classify at least a portion of the plurality of points in the three-dimensional point cloud into two or more categories by applying a classifying-oriented three-dimensional local descriptor and learning-based classifier; (c) extract from the three-dimensional point cloud scene one or more clusters of points utilizing the two or more categories by applying at least one of segmenting and clustering; and (d) match the extracted clusters with objects within a library by applying a matching-oriented three-dimensional local descriptor.

Other aspects of embodiments of the present invention include computer readable media encoded with computer executable instructions for performing any of the foregoing methods and/or for controlling any of the foregoing systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features described herein will be more readily apparent to those skilled in the art when reading the following detailed description in connection with the accompanying drawings, wherein:

FIG. 10 is plot of the precision-recall curve, according to an embodiment of the present invention;

DETAILED DESCRIPTION

Figure 1:
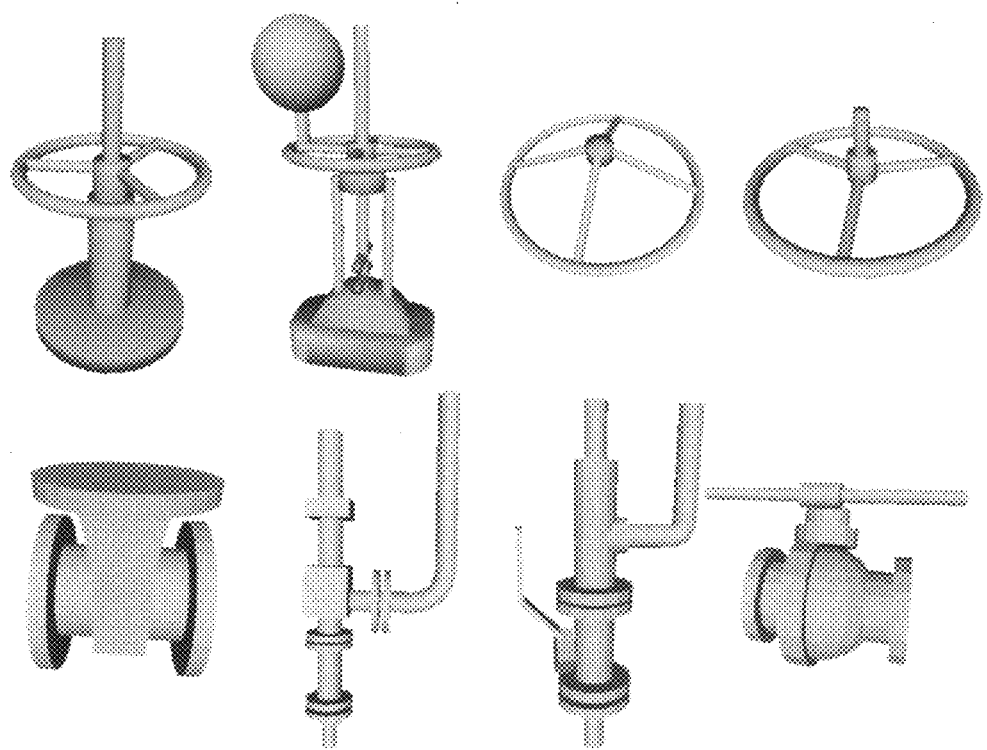
FIG. 1 shows a library of three-dimensional (3D) objects that can be found in a 3D point cloud industrial scene, according to an embodiment of the present invention.
Figure 2:
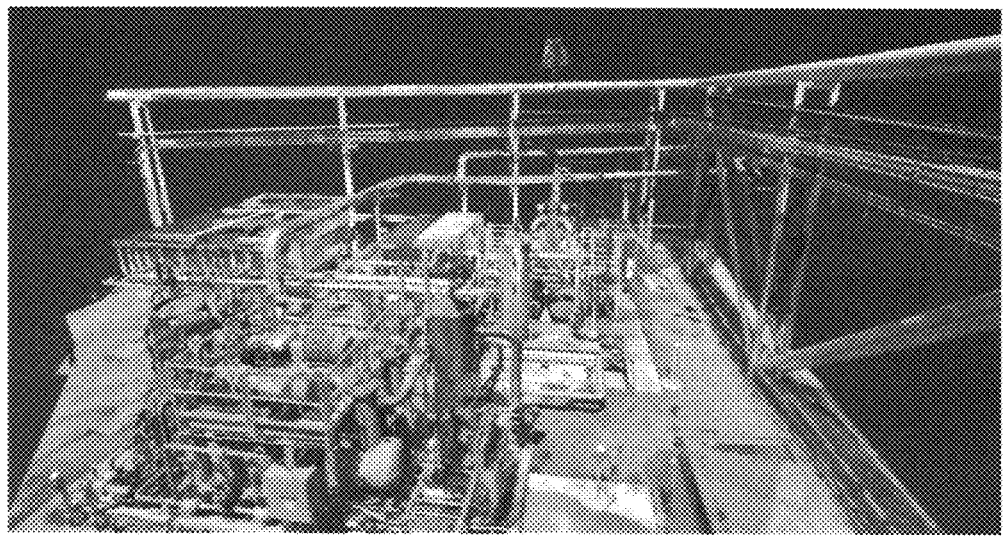
FIG. 2 shows an example of a 3D point cloud industrial scene, according to an embodiment of the present invention.

According to an embodiment of the present invention, there is provided a method of detecting one or more objects in a three-dimensional (3D) point cloud scene. For example, the objects can be industrial parts, such as valves, valve parts or connectors shown in FIG. 1. FIG. 1 shows a library of three-dimensional (3D) objects that can be found in a 3D point cloud industrial scene, according to an embodiment of the present invention. For example, the 3D point cloud scene can be an industrial scene such as a 3D scene or 3D image of oil or gas field equipment or oil refinery equipment. FIG. 2 shows an example of a 3D point cloud industrial scene, according to an embodiment of the present invention.

The use of 3D point cloud data provides numerous benefits over 2D image data. For example, the 3D point cloud data provides a better geometric spatial relationship between various elements present in the image. However, 3D point cloud data detection has also a set of challenges. First, the texture information in 3D point clouds may be less clear than the texture information in 2D images. Second, 3D point cloud data may be affected by noise and occlusions, in a different way than in 2D data. Third, objects in 3D space have more degrees of freedom, which may render alignment more difficult. Fourth, 3D point cloud data are typically large compared to 2D image data with millions of points even in a single scene. As a result, an object detection algorithm of higher efficiency may be needed for 3D point cloud data.

Figure 3:
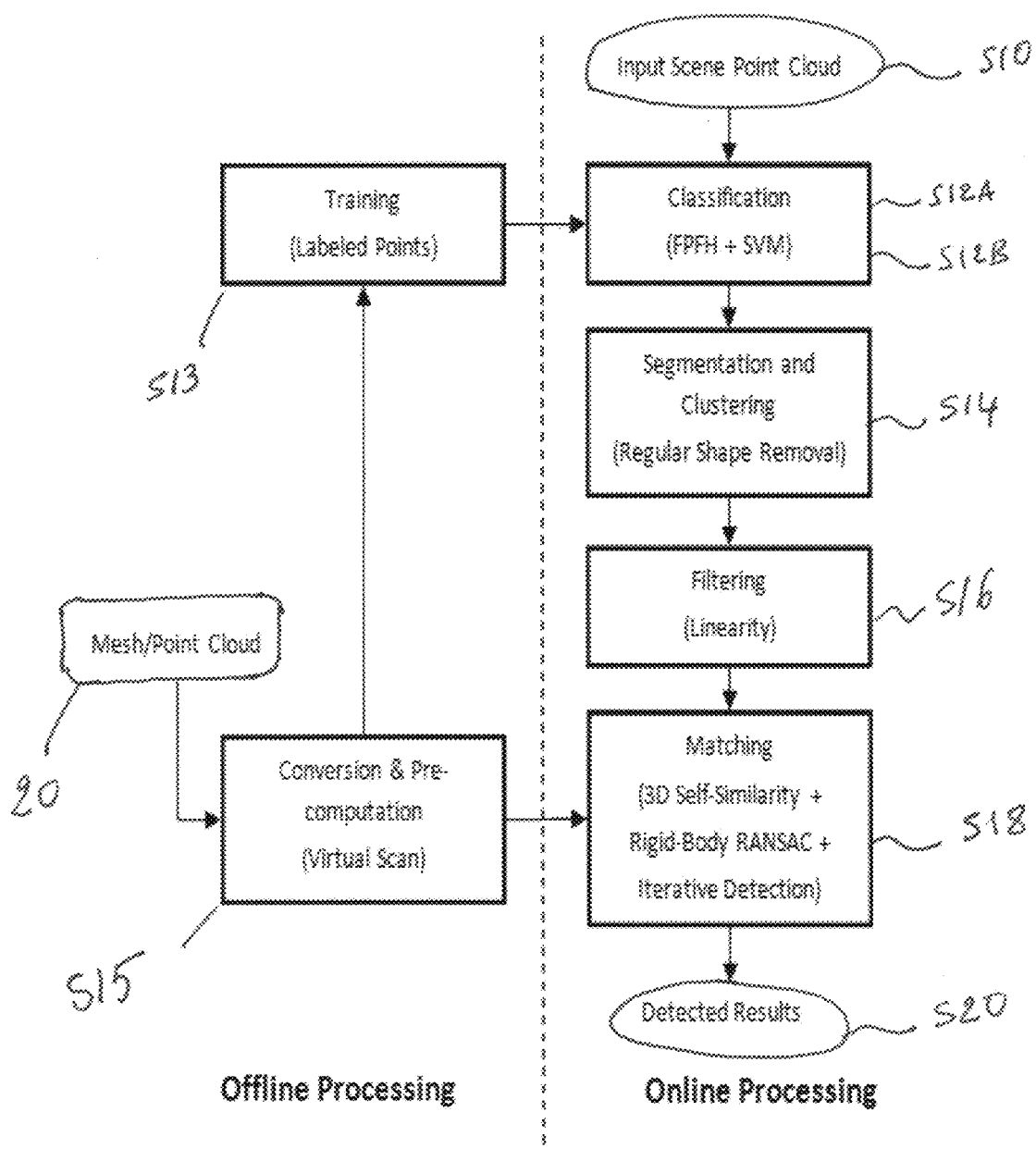
FIG. 3 is a flow-chart of a method of detecting one or more objects in a 3D point cloud, according to an embodiment of the present invention.

FIG. 3 is a flow-chart of a method of detecting one or more objects in a 3D point cloud, according to an embodiment of the present invention. The method includes inputting a scene point cloud, at S10. The scene point cloud is a 3D image of a scene. The 3D point cloud comprises a plurality of points provided in the xyz-space. For example, each point has (x, y, z) coordinates or cylindrical coordinates or spherical coordinates. In one embodiment, the scene can be for example an industrial scene comprising pipelines, valves, valve connectors, etc., as shown in FIG. 2. The method further includes classifying at least a portion of the plurality of points in the three-dimensional point cloud into two or more categories by applying a classifying-oriented three-dimensional local descriptor and learning-based classifier, at S12A and S12B.

In one embodiment, a three-dimensional Fast Point Feature Histogram (FPFH) is selected as the descriptor. Here, classifying includes calculating a Fast Point Feature Histogram (FPFH) at each point in the plurality of points in the point cloud, S12A. The principle for the selection of descriptor for classification can be depicted as: everything should be as simple as possible using simple geometry, but not simpler. By simple, it is meant that the calculation is not expensive, and the dimension is small. One of the simplest features is Shape Index (SI). However, SI only considers the principal curvatures, which is not distinctive enough for multiple categories in this application. On the other hand, brief experiments on simple shape classification show that other descriptors such as Spin Image and 3D Shape Context are outperformed by FPFH in both accuracy and efficiency. It is noted, however, the performance of the descriptors can be different when the descriptors are used in, for example, complex shape matching.

FPFH is an approximate and accelerated version of Point Feature Histogram (PFH). PFH uses a histogram to encode the geometrical properties of a point's neighborhood by generalizing the mean curvature around the point. The histogram representation is quantized based on all relationships between the points and their estimated surface normals within the neighborhood as shown in FIG. 4.

Figure 4:
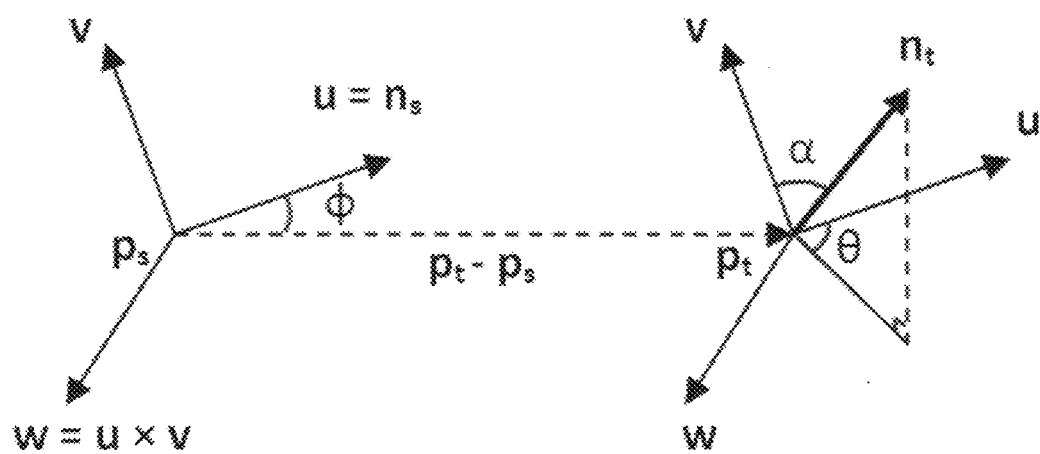
FIG. 4 illustrates a vector geometry used in point feature histogram calculation, according to an embodiment of the present invention.

FIG. 4 illustrates a vector geometry used in a point feature histogram calculation, according to an embodiment of the present invention. A local frame for computing a relative difference between two points $p_s$ and $p_t$ is defined in Equation (1).

$$\begin{cases} \vec{u} = \vec{n}_s \\ \vec{v} = \vec{u} \times \dfrac{(p_t - p_s)}{\|p_t - p_s\|_2} \\ \vec{w} = \vec{u} \times \vec{v} \end{cases} \quad (1)$$

With this frame, the difference between the point-normal pair can be represented by the angles in Equation (2).

$$\begin{cases} \alpha = \vec{v} \cdot \vec{n}_t \\ \varphi = \vec{u} \cdot \dfrac{(p_t - p_s)}{\|p_t - p_s\|_2} \\ \theta = \arctan(\vec{w} \cdot \vec{n}_t, \vec{u} \cdot \vec{n}_t) \end{cases} \quad (2)$$

these angles are then quantized to form the histogram.

FPFH reduces the computational complexity of PFH from $O(nk^2)$ to $O(nk)$, where k is the number of neighbors for each point p in point cloud P, without losing much of the discriminative power in PFH. Equation (3) provides the relationship between FPFH with conventional PFH.

$$FPFH(p_q) = PFH(p_q) + \dfrac{1}{k}\sum_{i=1}^{k} \dfrac{1}{w_k} \cdot PFH(p_k) \quad (3)$$

In one embodiment, the FPFH method that is used is retrieved from an open-source Point Cloud Library (PCL) that is described in "3D is here: Point Cloud Library (PCL); In Proceedings of the IEEE International Conference on Robotics and Automation (ICRA '11), Shanghai, China, May 2011," by R. B. Rusu and S. Cousins, the entire content of which is incorporated herein by reference.

In one embodiment, the classifying at S12A, S12B includes applying a support vector machine (SVM)-test on the plurality of points within the point cloud scene, at S12B to classify the plurality of points. The plurality of points are thus classified as one of the 4 regular categories (e.g., plane) or others. Although, SVM is used as a tool to classify the plurality of points, other methods may be employed as well. Other methods of classification may include k-Nearest Neighbor (k-NN) classifier, Decision Trees, Naive Bayes classifier, and various kinds of Probabilistic Graphic Models.

In the present example where the 3D point cloud is an industrial scene, as shown in FIG. 2, a large portion of the points belong to basic geometrical shapes, mainly planes (e.g. ground, ladders and boxes) and pipe-shapes (cylindrical pipes, bent connection, posts). Therefore, removing large clusters of such points can facilitate and accelerate support vector machine (SVM) processing and allow for focusing on the objects of interest to be detected.

In one embodiment, in the offline training stage, the method includes selecting and labeling about 75 representative small trunks of point clouds, which represents around 200 k labeled points. In one embodiment, support vector machine LIBSVM package using the radial basis function (RBF) kernel is applied, in which parameters C=8 and γ=0.5. A detailed description of LIBSVM can be found in "LIBSVM: A Library for Support Vector Machines. (2011), by C.-C. Chang and C.-J. Lin, and online at www.csie.ntu.edu.tw/~cjlin/libsvm, the entire content of which is incorporated herein by reference.

In some embodiments, it is determined that near places where two or more planes intersect, some points cannot be classified as "plane" points due to the interference of another plane in their neighborhood. On the other hand, these points do not belong to parts when they group together as a large cluster. Therefore, these points, which cannot be classified as plane points due to interference, are assigned to another category referred to as the "edge".

In addition to the presence of edges, some thinner pipes can be missing in pipe detection. Experiments show that simply adding the thinner pipes in the training dataset may have negative effects on pipes with larger sizes or thicker pipes. This suggests that the thinner pipes may need to be regarded as a separate category from pipes. This may be partially due to the neighborhood size of the FPFH descriptor.

In order to determine the ability to distinguish pipes of different sizes, a series of cross validation can be performed. For example, a series of cross-validation is summarized in Table 1.

TABLE 1

| Training | Testing | | | |
| --- | --- | --- | --- | --- |
|  | 5 cm | 10 cm | 15 cm | 20 cm |
| 5 cm | Y | N | N | N |
| 10 cm | N | Y | Y | Y |
| 15 cm | N | Y | Y | Y |
| 20 cm | N | Y | Y | Y |

Table 1 provides cross validation results for pipes of different sizes. The left column corresponds to the training data, and the top row corresponds to the testing data. "Y" indicates that at least 80% of the testing points are classified as pipe, while "N" indicates the opposite. Accordingly, Table 1 shows that 10, 15, 20-cm pipe classifiers can classify the 10, 15, 20-cm pipes interchangeably, while a 5-cm pipe classifier can distinguish the 5-cm pipe from the others. This demonstrates how the category "Thin-Pipe" can be separated from the category "Pipe" if desired. If distinguishing between 10, 15, 20-cm pipes is further desired or needed, other sizes can be added as negative examples to provide further precise boundaries between them.

Figure 5:
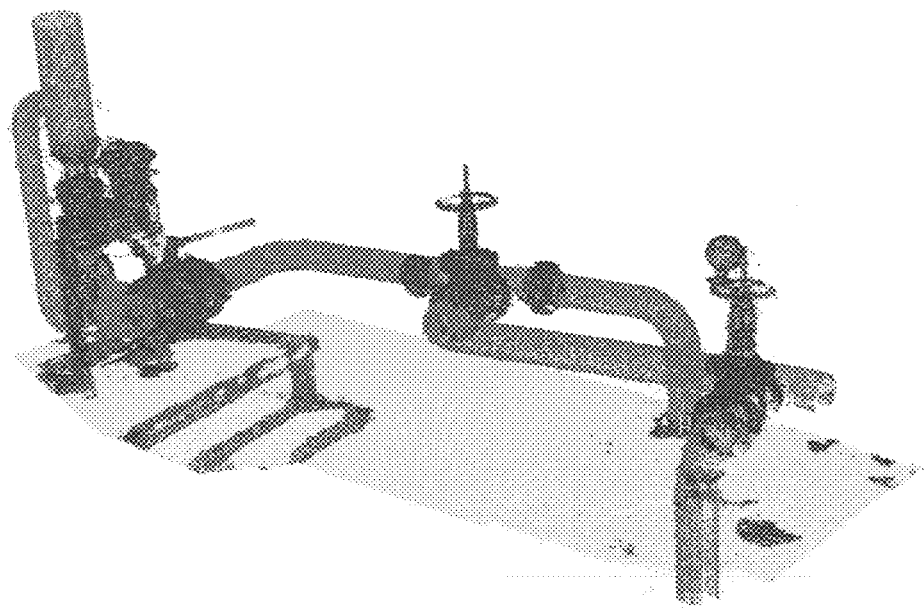
FIG. 5 shows an example of a 3D point cloud industrial scene where pipe points, plane points, edge points and the remaining part points are classified, according to an embodiment of the present invention.

In one embodiment, points are labeled/categorized as plane, pipe, edge, thin-pipe or other points. Here, SVM is performed 4 times, once for each category. FIG. 5 shows an example of a 3D point cloud industrial scene where pipe points (normal/thin), plane points, edge points and other points are classified, according to an embodiment of the present invention. Plane points are depicted as yellow, pipe points are depicted as green, edge points are depicted as purple and the rest are depicted as red. Some large pipe-shaped objects, such as tanks having a relatively large radius, locally appear as planes. As a result, for purposes of better segmentation, relatively large tanks with smaller curvature (i.e., larger curvature radius) are assimilated as planes rather than pipes. The terms "larger" and "smaller" are relative terms and are used herein in the context that a tank appears with a larger radius than a regular pipe having a smaller radius within the same 3D point cloud scene. For example, in some embodiments, items having a curvature radius greater than 40 cm are assimilated as planes.

In the above paragraphs, the classification step at S12A, S12B is performed using FPFH and SVM (FPFH+SVM). However, the classification step at S12A, S12B can also be performed using other combination of methods. For example, instead of FPFH+SVM, SVM and a 3D self-similarity (3D SSIM) descriptor can be used (i.e., 3D SSIM+SVM). Self-Similarity (SSIM) is the property held by parts of data or object that resemble themselves in comparison to other parts of the data. The resemblance can be photometric properties, geometric properties or a combination thereof. The 3D SSIM is an extension of self-similarity concept to the 3D domain. To calculate the descriptor, the 3D extension of 2D self-similarity surface is generated using the normal similarity across the local region. The normal similarity between two points x and y is defined by the angle between the normals. Then, the self-similarity surface is quantized along log-spherical coordinates to form the 3D self-similarity (3D-SSIM) descriptor in a rotation-invariant manner, achieved by using a local reference system at each key point.

Another classification method that can be used for classification at S12A, S12B is the Spin Image (SI) in combination with SVM (i.e., SI+SVM). Spin Image (SI) is a well-known feature descriptor for 3D surface representation and matching. One key element of spin image generation is the oriented point, or 3D surface point with an associated direction. Once the oriented point is defined, the surrounding cylindrical region is compressed to generate the spin image as the 2D histogram of number of points lying in different distance grids. By using local object-oriented coordinate system, the spin image descriptor is view independent. Several variations of spin image have been suggested. For example, a spherical spin image for 3D object recognition can be used. The spherical spin image can capture the equivalence classes of spin images derived from linear correlation coefficients.

Another method that can also be used for classification at S12A, S12B is the SVM in combination with 3D Shape Context (3D SC). 3D Shape Context is an extension of the 2D Shape Context (2D SC) approach, which is a well-known method for matching 2D shapes (especially hand-written digits and letters) and 2D object recognition without relying on extracted features. It combines global (by regarding all points of a shape) and local (by storing information about the relation of all possible point pairs) shape knowledge in a clever way. The support region for a 3D shape context is a sphere centered on the basis point p and its north pole oriented with a surface normal estimate for p. The support region is divided into bins determined by the log-polar coordinate system.

In one embodiment, the above classification methods are compared in terms of computational speed and running time. Table 2 provides a summary of the running time comparison. The running time includes three parts: descriptor computation, SVM training and SVM testing. Descriptor computation time is related to the time complexity of the descriptor itself, while the time for SVM training and SVM testing depends largely on the dimensionality of the descriptor. In Table 2, the minus sign (−) indicates relatively shorter time (e.g., less than 2 hrs), while the plus sign (+) indicates a relatively longer time (e.g., between 2 and 5 hrs), and the double plus sign (++) indicates an even longer time (e.g., greater than 5 hrs). As it can be noted from Table 2, the SVM+FPFH method provides overall a faster running time (about 1 hour) compared to the other methods.

TABLE 2

|  |  | Time | | |
| --- | --- | --- | --- | --- |
|  | Dimension | Overall | Descriptor | SVM Training | SVM Testing |
| SVM + FPFH | 33 | ~1 h | − | − | − |
| SVM + SSIM | 125 | ~6 h | − | + | + |
| SVM + SI | 153 | ~6 h | − | + | + |
| SVM + SC | 125 | ~12 h | ++ | + | + |

In another embodiment, the above classification methods are compared in terms of precision. Table 3 provides a summary of the precision comparison. Precision is expressed as the ratio between points correctly classified as positive (TP=True Positive) and the sum of TP and points wrongly classified as positive (FP=False Positive). The precisions can be written as TP/(TP+FP). A lower percentage of false-prediction provides a higher precision. Recall is expressed as the ratio between TP and the sum of TP and points classified wrongly classified as negative (FN=False Negative). The recall can be written as TP/(TP+FN). A lower percentage of miss-prediction provides a higher recall rate.

TABLE 3

|  | Precision = TP/(TP + FP) | Recall = TP/(TP + FN) |
| --- | --- | --- |
| SVM + FPFH | 72.8% | 84.7% |
| SVM + SSIM | 48.6% | 60.3% |
| SVM + SI | 36.4% | 86.3% |
| SVM + SC | 18.3% | 91.9% |
| All-Positive | 12.9% | 100.0% |

As it can be noted in Table 3, SVM+FPFH outperforms the other methods in precision as well, while retaining a relatively high recall. It is noted that even the trivial All-Positive classifier can achieve 100% recall, but with a very low precision. Therefore, precision is a more important indicator in this table, particularly when the recall rate is relatively high (e.g., greater than 75%).

In one embodiment, prior to performing the classification, at S12A-B, a library of objects 20 may be used for training the classification model so as to be able to distinguish various features or objects within the 3D scene point cloud. In one embodiment, this may include training, at S13. For example, the SVM can be trained for the so-called regular points, including plane, pipe and edge points. In one embodiment, this may include calculating a Fast Point Feature Histogram (FPFH) for each point within the input scene cloud (e.g., 3D point cloud) using, for example, the method disclosed in "Fast Point Feature Histograms (FPFH) for 3D Registration in Proceedings of the IEEE International Conference on Robotics and Automation (ICRA), Kobe, Japan, May 12-17 2009" by R. B. Rusu, N. Blodow, and M. Beetz, the entire content of which is incorporated herein by reference, and then feeding several trunks of a positive/negative clusters in the SVM.

In one embodiment, the library 20 may contain both mesh models and point cloud models of the objects. Examples of library objects that may be present in the 3D point cloud scene shown in FIG. 2, are depicted in FIG. 1. In particular, FIG. 1 depicts a series of objects (e.g., valves, connectors, etc.) that may be detected in the 3D scene point cloud shown in FIG. 2. If a mesh model of the objects within the library 20 is provided, a virtual-scanning process is used, at S15, to create a corresponding point cloud in the library. In other words, a procedure is employed for converting the objects that are mesh-based into objects that are point cloud-based. The virtual scanning simulates the way a real scanner works. A Z-buffer scan conversion and back-projection are used to eliminate points on hidden or internal surfaces. The point clouds in the library 20 are pre-processed so that features and descriptors are prepared for matching.

There are many learning or training methods available. In some embodiments, SVM is used as a classifier for the following reasons. First, classification is performed on simple geometric shapes. Thus, complicated descriptors or complicated classifiers may not be needed. Second, the generalization ability of the classifier is used since a limit number of training examples (especially for the parts) are present while there may exist many more types of shapes. Finally, although there may be many categories (e.g., 5), they are typically not equivalent. For example, in some embodiments, "part" is the only category used in detection. Hence, a subtraction process is used over the 2-class classification results. See, for example, below equations (4) and (5).

However, the scalability to apply SVM to more complicated multi-class objects may also be considered. In the present example, however, boundaries between categories other than the parts (e.g., big pipes can be classified as plane, pipes can be classified as thin pipes as long as the result is consistent) may be ignored. The classification algorithm applying, for example, the FPFH and SVM methods is efficient enough to solve the seemingly multi-class, but intrinsically 2-class problem.

In some embodiments, five categories are used for training clusters: Plane, Pipe, Edge, Thin-Pipe and Part. Since two-class classification is used, when one kind of classifier is trained, all clusters labeled as this class will be regarded as the positive example, while the negative samples will be selected from the remaining categories. Table 4 summarizes the statistics of training data. In Table 4, TrC=Training Cluster, TrP=Training Point, and SV=Support Vector. The ratio corresponds to the ratio Positive/Negative.

TABLE 4

| Classifier | #TrC | #TrP | #SV |
| --- | --- | --- | --- |
| Plane | 14/23 | 94602 | 2069/2063 |
| Pipe | 14/9 | 91613 | 1496/1503 |
| Edge | 9/24 | 94838 | 1079/1121 |
| Thin Pipe | 8/22 | 83742 | 1020/1035 |

The number of support vectors shows the complexity of the category, in order to distinguish it from the others. Table 5 shows the number of points in the residual point cloud after removing each of the four categories. The effectiveness of the point classification step is demonstrated as the percentage of points needing classification is drastically reduced prior to detection—nearly half of the points are removed with the classification of plane, an additional 20% are removed with the classification of pipe, and only one fifth of the original points need to be considered in detection after edge and thin pipe are removed.

TABLE 5

|  | Original | Plane | Pipe | Edge | Thinpipe |
| --- | --- | --- | --- | --- | --- |
| #Pts | 25,135k | 14,137k | 8,767k | 6,015k | 5,534k |
| (%) | 100.0% | 56.2% | 34.9% | 23.9% | 22.0% |

The method further includes segmenting and clustering, at S14. In one embodiment, connected components of the same category are extracted and fitted, while remaining points are clustered based on Euclidean distance. There exist many segmentation procedures including the min-cut approach and other approaches derived from 2D cases. However, if classification of non-part (background) points is made with relative confidence, the segmentation step can be done in a fast and light-weighted manner.

In one embodiment, the segmentation procedure includes iteratively selecting a random unvisited seed point and expanding the seed point to unvisited neighboring points within a given Euclidean distance using the classical Flood-Fill algorithm. A neighbor threshold is determined by a granularity of the input cloud. After finite steps, the residual cloud can be divided into a number of disjoint clusters.

In one embodiment, the segmentation method further includes applying a clustering routine for two or more times (e.g., 5 times). First, clustering is performed on points labeled as one of the four categories to get a list of plane/pipe/edge/thin-pipe clusters, respectively. Then, the relatively large clusters are subtracted from the original point cloud. This is performed so as not to remove small areas of regular shapes that may lie on a relatively larger part. Finally, clustering is performed on the remaining points that are believed to be part points.

Using S(C) to denote the set of points in category C, a segmentation algorithm can be expressed by the following equation (4).

$$S(\text{Candidate}) := S(\text{All}) - S(\text{Plane}) - S(\text{Pipe}) - S(\text{Edge}) - S(\text{ThinPipe}) \quad (4)$$

An extendable definition of the candidates can be derived and expressed by equation (5).

$$S(\text{Candidate}) := S(\text{Irregular}) = S(\text{All}) - \cup_i S(\text{Regular}_i) \quad (5)$$

where $\text{Regular}_i$ can be any connected component with repetitive patterns and large size. This definition also offers the possibility of discovering candidates of new targets that are actually not in the database.

Figure 6:
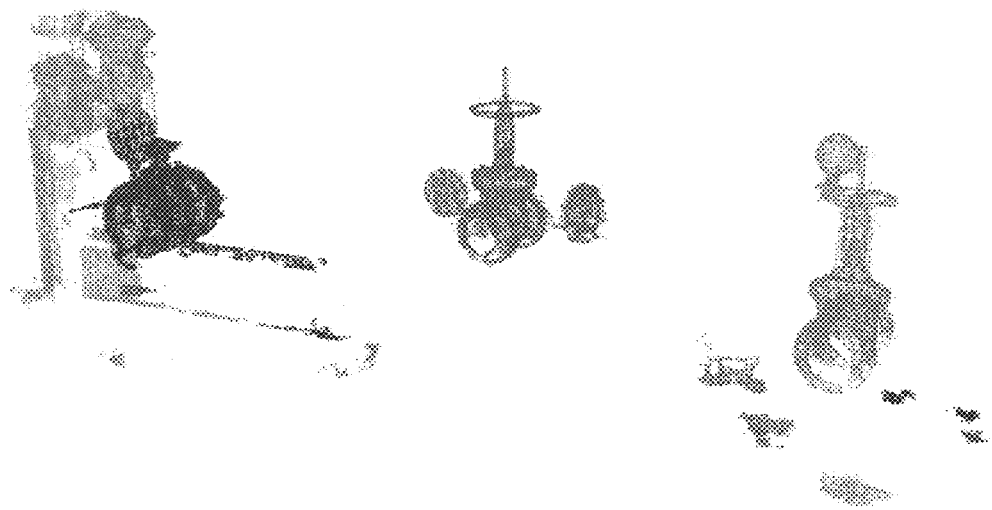
FIG. 6 shows a result of the segmentation and clustering of the 3D point cloud scene shown in FIG. 5.

FIG. 6 shows a result of the segmentation and clustering of the 3D point cloud scene shown in FIG. 5. The blue, green, and purple points correspond to smaller parts of interest within the 3D point cloud scene or image shown in FIG. 5. These parts appear to show valves and connectors, as will be further described in the following paragraphs.

The method can further include filtering the clustered points to obtain clustered filtered points, at S16. In one embodiment, each cluster is passed through a cluster filter. The cluster filter may include one or more filters, based on application, that can segregate clusters with or without certain significant characteristics.

In one embodiment, it is determined that even after performing the segmentation and clustering, it can be observed that not all clusters are not good candidates for matching. For example, a number of clusters in a scene may not belong to a category of objects in a library that the user may have selected. As a result, clusters are further filtered using a filter that can quickly segregate clusters with or without certain characteristics. In one embodiment, the filter is selected so as to be a fast filter while being able to filter out a number of impossible candidates. In one embodiment, a linear filter is used. However, as it can be appreciated, other types of filters can also be used including non-linear filters.

The linearity of a cluster can be evaluated by the absolute value of a correlation coefficient in the Least Squares Fitting (LSF) on the 2D points of the three projections on the x-y, y-z and z-x planes. For example, the correlation coefficient in the x-y plane can be expressed by the following equation (6).

$$r_{xy} = \frac{\sum_{i=1}^{n}(x_i - \bar{x})(y_i - \bar{y})}{\sqrt{\sum_{i=1}^{n}(x_i - \bar{x})^2 * \sum_{i=1}^{n}(y_i - \bar{y})^2}} \quad (6)$$

A linearity score is measured by equation (7) by taking the maximum of the correlation coefficients calculated in the xy, yz and zx planes.

$$r = \max(|r_{xy}|, |r_{yz}|, |r_{zx}|) \quad (7)$$

A cluster can be considered to be linear if the correlation coefficient is greater than 0.9 (r>0.9). In this case, at least one of its projections can be fitted by a line with higher confidence. It can be noted that planes and thin pipes may fall in this linear category. However, since planes (including large diameter pipes) and thin pipes (small diameter pipes) were removed using the classification steps S12A and S12B and regular shape removal S14, any remaining linear clusters are considered to be lines, missed pipes, missed planes, or noise in this embodiment. Experiments show that the linearity scores of all representative targets or objects are below 0.8, with a substantial margin from the threshold of 0.9. This indicates the selected target objects will not be filtered out in this step. The selected target objects will not be filtered out because only clusters with linearity score higher than 0.9 will be filtered, while all the selected objects have scores smaller than 0.8 will not be filtered. In one embodiment, out of 1905 initial clusters obtained after the segmentation and clustering at step S14, only 1491 candidates remained after eliminating the most linear clusters.

The method further includes matching candidate clusters (or filtered clusters) with objects within the library, at S18. In one embodiment, descriptors for candidate clusters generated online are compared to descriptors for the objects within the library that are generated offline.

In one embodiment, the matching includes comparing the feature representations with point descriptors between the candidate clusters and part library objects. Initially all nearest-neighbor correspondences, or pairs of features, with the Nearest Neighbor Distance Ratio (NNDR) value, are computed and then, a "greedy" filtering strategy is applied. In the greedy strategy, a heuristic approach is applied such that a locally optimal choice is made. For example, the confirmed matches/correspondences in each step can be selected from the candidate correspondences with the smallest NNDR values. A transformation is estimated based on all correspondences in accord with the hypothesis, and refined through Gram-Schmidt Orthogonalization. The percentage of aligned points can be used as the matching score. If the matching score between a cluster and an object (a target object) within the library is higher than certain threshold, the cluster is considered to be a detected instance of the object within the library (i.e., a target object within the library). That is, the object within the library is detected in the 3D point cloud.

In case that there are multiple targets in a single cluster, the aligned part is iteratively removed until the remaining part of the cluster is small enough. In one embodiment, the aligned part is iteratively removed until the remaining part of the cluster is less than 300 points, for example, which is considered a "small enough" cluster.

In one embodiment, the matching is performed using a three-dimensional Self-Similarity (3D SSIM) descriptor. In one embodiment, the 3D SSIM descriptor described in "Point Cloud Matching based on 3D Self-Similarity International Workshop on Point Cloud Processing (Affiliated with CVPR 2012), Providence, R.I., Jun. 16, 2012," by J. Huang, and S. You, the entire content of which is incorporated herein by reference, is used to match candidate and target object point clouds. In the present example, a simplified version is used where the normal similarity is employed since there is typically no intensity information in the targets (i.e., objects in the library).

In one embodiment, key-points on both point clouds are first extracted to find matches on a local scope, i.e. between points in the two point clouds. A descriptor (vector) on each of the key-points can then be calculated. A set of candidate matches (i.e., a pair of key-points on the two point clouds) are found if the distance between the descriptors at the two key-points is small (i.e., satisfying the Nearest-Neighbor-Distance-Ratio criteria).

In one embodiment, subsets of the candidate matches are selected (since some of them are wrong matches) and the selected candidate matches are used to calculate the transformation between the point clouds to find a match between two point clouds on a global scope. If the transformation makes the two point clouds well-aligned, then the matches used to calculate the transformation are considered the final matches between the two point clouds. It is then stated that the two point clouds are matched. In the present example, the transformation is used to satisfy the rigid-body constraint. However, in other applications, the transformation can have other types of constraints.

In one embodiment, the feature extraction process is performed such that 3D peaks of local maxima of principle curvature are detected in the spatial space. Given a point of interest and a local region of the point, two major steps are employed to construct the descriptor.

First, a 3D extension of a 2D self-similarity surface is generated using the normal similarity across the local region. The normal similarity between two points x and y is defined by the angle between the normals, as provided in equation (8) (assuming $\|\vec{n}(\cdot)\|=1$).

$$s(x,y,f_n)=[\pi-\cos^{-1}(f_n(x)\cdot f_n(y))]/\pi=[\pi-\cos^{-1}(\vec{n}(x)\cdot \vec{n}(y))]/\pi \quad (8)$$

When the angle between the normals is substantially 0, the function returns 1. Whereas, when the angle between the normal is substantially $\pi$, i.e. the normals are opposite to each other, the function returns 0.

Second, the self-similarity surface is quantized along log-spherical coordinates to form the 3D self-similarity descriptor in a rotation-invariant manner. This is achieved by using local reference system at each key point. The z-axis is the direction of the normal. The x-axis is the direction of the principal curvature. The y-axis is the cross product of z and x directions. In this example, 5 divisions in radius, longitude and latitude, are set. The values in each cell are then replaced with the average similarity value of all points in the cell. This results in a descriptor of 5*5*5=125 dimensions. The dimensions can be reduced without deduction of performance. Finally, the descriptor is normalized by scaling the dimensions with the maximum value to be 1.

In one embodiment, detection is performed by matching. In matching, the descriptors for the candidate clusters generated online are compared against the descriptors for the targets generated offline. The transformation is then estimated. To establish the transformation, nearest neighbors are first calculated with any Nearest Neighbor Distance Ratio (NNDR) between the candidate cluster and the target object from the library. Then, unlike the normal Random Sample Consensus (RANSAC) procedure, a "greedy algorithm" is used. The greedy algorithm is based on the observation that (1) the top-ranked correspondences are more likely to be correct; and (2) the objects to be detected are rigid industrial parts with fixed standard sizes and shapes. In general, the transformation can be represented by equation (9).

$$p'=sRp+T \quad (9)$$

where s is the scaling factor, R is the rotation matrix and T is the translation vector.

For rigid-body transformation, s=1. Therefore, solving for the 12 unknowns (7 of which are independent) in 3*3 matrix R and 3*1 vector T may be needed. This may need at most 4 correspondences of (p, p'). A greedy 4-round strategy can be used to find the 4 correspondences based on the following insight: rigid-body transformation preserves the distance between points. Initially, nearest-neighbor correspondences with any NNDR value in the candidate set are obtained. In the beginning of round i, the correspondence with the minimum NNDR value, $c_i=(a_i, b_i)$, is added to the final correspondence set and removed from the candidate set. Then, for each of the correspondence c'=(a', b') in the candidate set, the Euclidean distance dist(a', $a_i$) and dist(b', $b_i$) is calculated. If the ratio of the (squared) distance is larger than some threshold (1.1), c' is removed from the candidate set. If the candidate set becomes empty within 4 rounds, for example, the match is discarded as a failed rigid-body match. Otherwise, the transformation can be estimated over at least 4 distance-compatible correspondences. Specifically, a 3*3 affine transformation matrix and a 3D translation vector are solved from the equations formed by the correspondences.

To prevent matching from being sensitive to the first correspondence, multiple initial seeds are tried and only the transformation with the highest alignment score is selected. Finally, the rigid-body constraint is used again to refine the result, through the known Gram-Schmidt Orthogonalization of the base vectors (R=$(\vec{n}_1, \vec{n}_2, \vec{n}_3)$), as expressed in equation (10).

$$\begin{cases} \vec{u}'_1 = \vec{u}_1 \\ \vec{u}'_2 = \vec{u}_2 - proj_{\vec{u}'_1}(\vec{u}_2) \\ \vec{u}'_3 = \vec{u}_3 - proj_{\vec{u}'_1}(\vec{u}_3) - proj_{\vec{u}'_2}(\vec{u}_3) \end{cases} \quad (10)$$

The vectors $\vec{n}'_1, \vec{n}'_2, \vec{n}'_3$ are the non-normalized bases of the new transformation. The normalized basis that form the new transformation matrix R' are $\vec{n}'_1, \vec{n}'_2, \vec{n}'_3$, i.e R'=$(\vec{n}'_1, \vec{n}'_2, \vec{n}'_3)$. The vectors $u'_i$ are normalized using equation (11).

$$\vec{e}'_i = \frac{\vec{u}'_i}{\|\vec{u}'_i\|}, i=1, 2, 3 \quad (11)$$

A point p in cluster A is said to be aligned with a point in cluster B if the nearest neighbor in cluster B to p under the transformation is within a threshold (e.g., 5e-4 for an industrial scene). The alignment score is thus defined as the percentage of aligned points. If the alignment score between a cluster and a target is larger than 0.6, the cluster is considered to be a detected instance of the target.

In case that there are multiple targets in a single cluster, the aligned part is iteratively removed through the cloud subtraction routine. The remaining part of the cluster is examined until the remaining part is small enough to be matched. In one embodiment, the aligned part is iteratively removed until the remaining part of the cluster is less than 300 points, for example, which is considered a "small enough" cluster.

Figure 7:
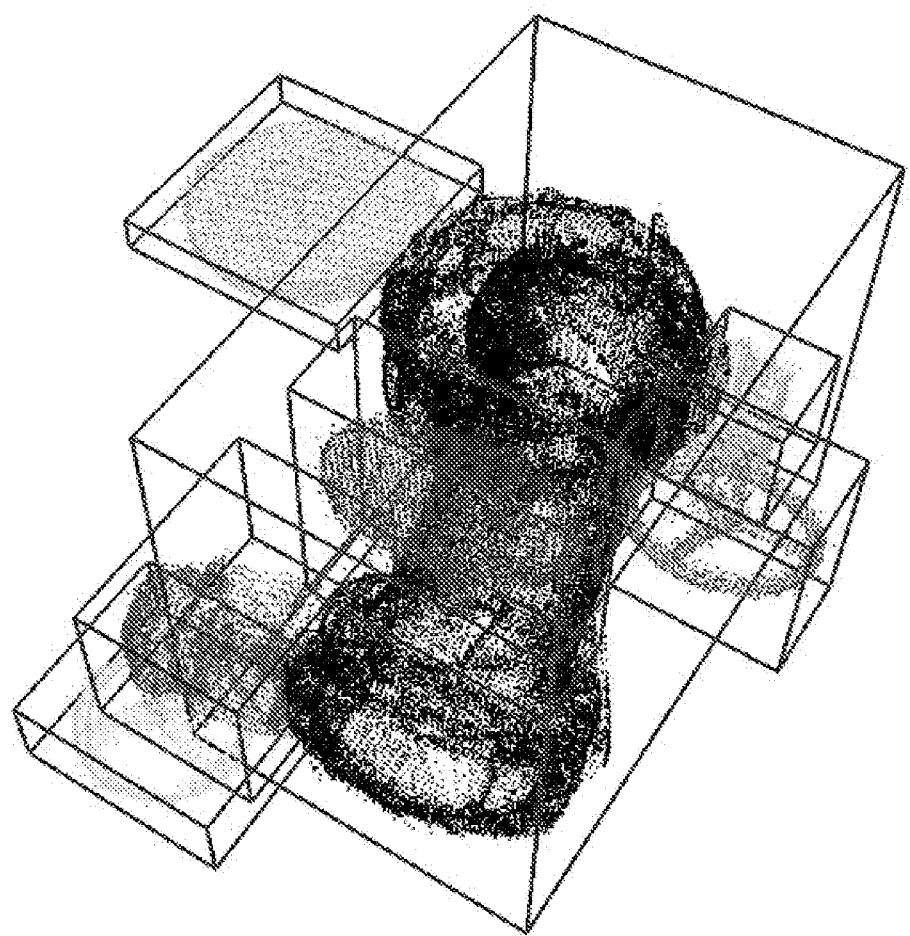
FIG. 7 depicts an assembly of several parts that are detected by the present detection method, according to an embodiment of the present invention.

The present method is applied in multi-target detection in a single cluster. An assembly is divided into several parts. The parts are then detected one-by-one using the alignment and iterative detection process. FIG. 7 depicts an assembly of several parts that are detected by the present detection method, according to an embodiment of the present invention. In this example, segmentation is not used, and the descriptors are not identical at the same location of the parts and the assembly. That is, the points (in a neighborhood of a key-point) used to calculate the descriptor in the part are a subset of the points (in a neighborhood of a key-point) used to calculate the descriptor in the assembly because the part point cloud is a subset of the assembly point cloud. This means that the detection is non-trivial.

In the following paragraphs, testing results of the method on an industrial scene point cloud are provided.

Figure 8:
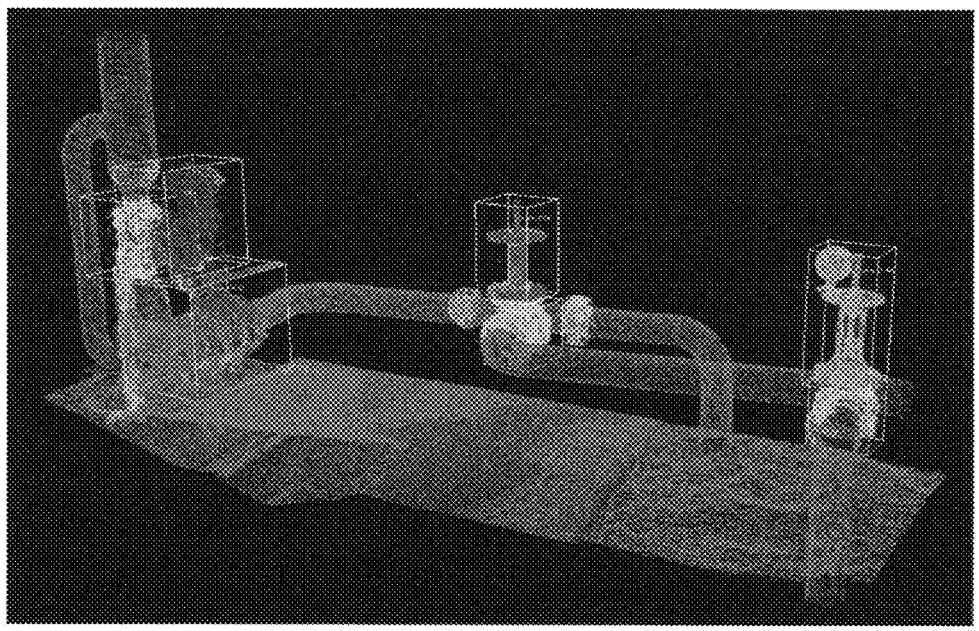
FIG. 8 depicts detection results from a sub-scene of an industrial 3D-point cloud, according to an embodiment of the present invention.
Figure 9:
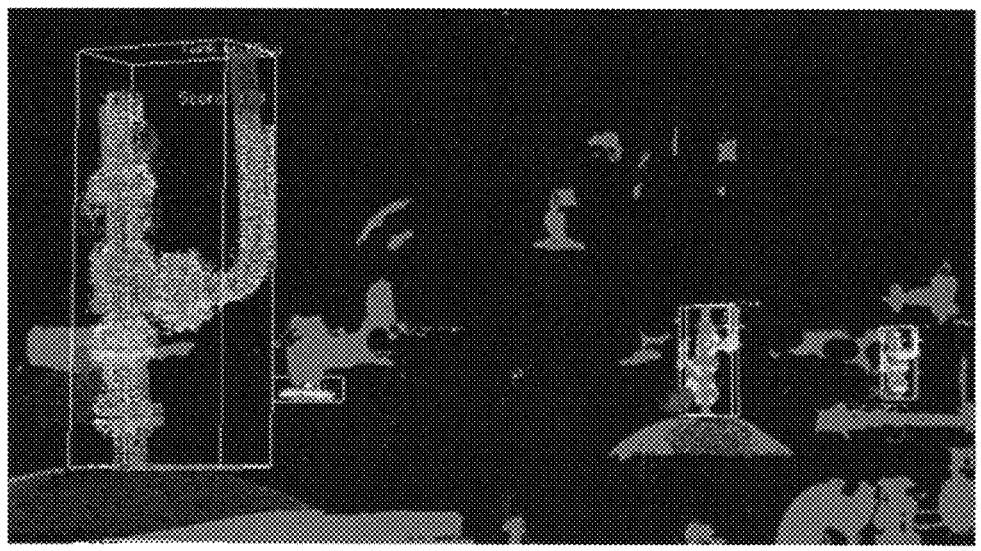
FIG. 9 shows another 3D point cloud scene where parts that are detected are shown in color with respect to ground truth, according to an embodiment of the present invention.

FIG. 8 depicts a sub-scene of an industrial 3D-point cloud, according to an embodiment of the present invention. Detected parts are highlighted in color and bounding boxes. FIG. 9 shows another 3D point cloud scene where parts that are detected are shown in color with respect to ground truth, according to an embodiment of the present invention. The red color indicates false negative, i.e. the object is mis-detected or the point on the candidate cluster is misaligned. The blue color indicates false positive, i.e. there is no target at the position but the algorithm detected one, or the point on the target is misaligned. The yellow and cyan colors indicate true positive, i.e., the aligned points are close enough.

Figure 10:
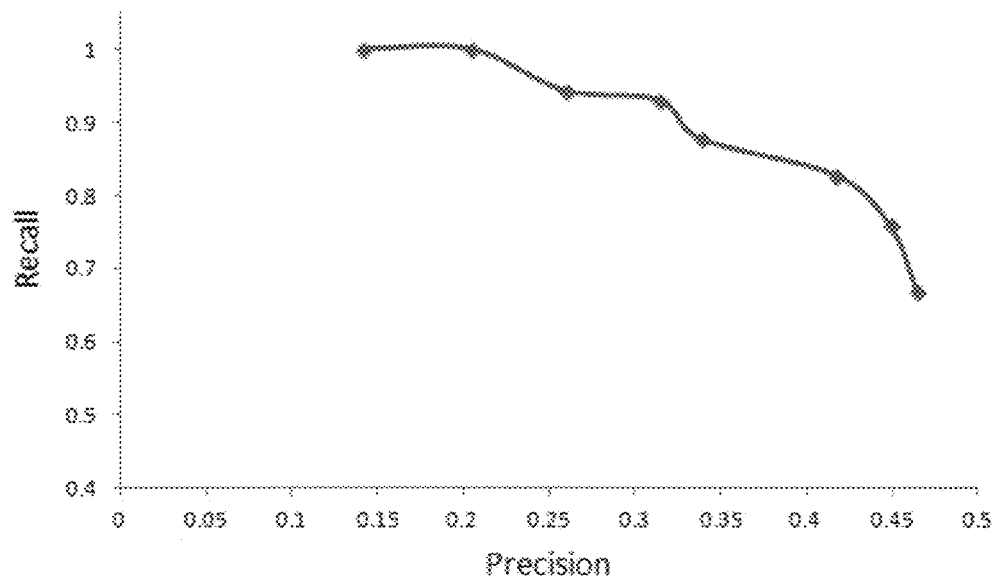
FIG. 10 shows the statistical results of the industrial scene, according to an embodiment of the present invention.

Table 6 and FIG. 10 show the statistical results of the industrial scene, according to an embodiment of the present invention. Balls, flanges, tanktops and valves are more successfully detected than the other objects. In Table 6, there are 8 categories, 33 sub-categories and 127 instances (Ground-truth) of targets in the scene. Among them 62 are correctly identified (TP=True Positive), while 35 detections are wrong (FP=False Positive), and 65 instances are missed (FN=False Negative).

TABLE 6

| Category | #Sub-cat. | #Truth | #TP | #FP | #FN |
|---|---|---|---|---|---|
| Ball | 1 | 22 | 11 | 4 | 11 |
| Connection | 2 | 3 | 0 | 0 | 3 |
| Flange | 4 | 32 | 20 | 3 | 12 |
| Handle | 6 | 10 | 3 | 1 | 7 |
| Spotlight | 1 | 6 | 1 | 0 | 5 |
| Tanktop | 2 | 4 | 3 | 3 | 1 |
| T-Junction | 5 | 25 | 7 | 0 | 18 |
| Valve | 12 | 25 | 17 | 24 | 8 |
| All | 33 | 127 | 62 | 35 | 65 |

FIG. 10 is a plot of the recall number versus the precision, according to an embodiment of the present invention. The recall number is higher for smaller precision and lower for higher precision.

Results of the experiment show that the present method works with virtual point clouds almost as well as with real point clouds. Since the virtual point clouds can be automatically generated from mesh models with a virtual scanner, fully-automatic matching between the point clouds and the mesh models can be expected.

Figure 11A:
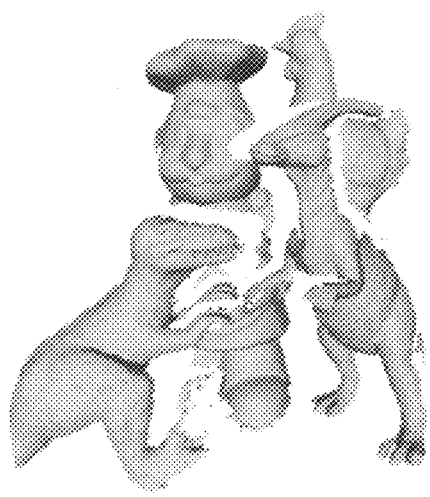
FIG. 11A depicts an example of publically available 3D data in which occlusion of some data point by other data points is present.
Figure 11B:
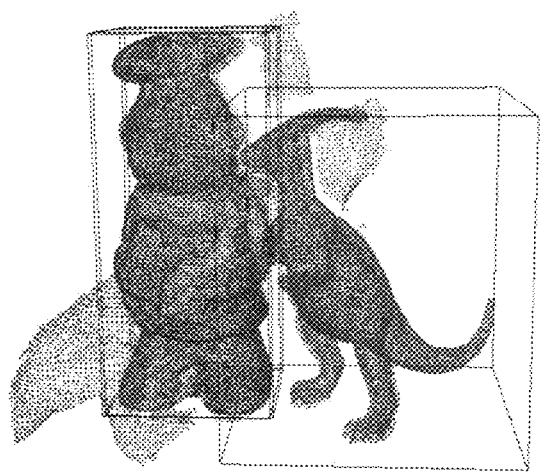
FIG. 11B depicts a result of applying the detection method to the scene in FIG. 11A, according to an embodiment of the present invention.

For the sake of comparing the present method with other methods, the algorithm is tested on some of publicly available 3D point cloud data. FIG. 11A depicts an example of publicly available 3D point cloud data in which occlusion of some data points by other data points is present. For example, the "dinosaurs" are partly occluding the "chef". As shown in FIG. 11A occlusions lead to discontinuity of some parts, which renders matching or detection challenging. FIG. 11B depicts a result of applying the detection method to the scene in FIG. 11A, according to an embodiment of the present invention. As shown in FIG. 11B, by using the present matching and detection method, the entirety of the "chef" (shown in yellow) is detected from only portions of the "chef" that are shown in FIG. 11A. In addition, the right dinosaur shown in blue in FIG. 11B is also detected and completely rendered. This is achieved by using appropriate library objects or targets. The library of objects in this case contains the "chef" and the "blue dinosaur". However, the library of objects does not contain the left dinosaur and as a result, the left dinosaur is not detected and is shown in gray in FIG. 11B. It must be appreciated that in the present detection method, the point classification phase is not used. Therefore, the point classification method is an optional step in the present method.

An object detection framework for a 3D scene point cloud is described using a combinational approach containing SVM-based point classification, segmentation, clustering, filtering, 3D self-similarity descriptor and rigid-body RANSAC. The SVM+FPFH method in pipe/plane/edge point classification gives a nice illustration of how descriptors can be combined with training methods. Applying two local descriptors (FPFH and 3D-SSIM) in different phases of processing shows that different descriptors could be superior under different circumstances. The proposed variant of RANSAC considering the rigid body constraint also shows how prior knowledge could be incorporated in the system. The experiment results show the effectiveness of this method, especially for large cluttered industrial scenes.

In one embodiment, the method or methods described above can be implemented as a series of instructions which can be executed by a computer, the computer having one or more processor processors configured to execute computer modules. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Various databases can be used which may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 12:
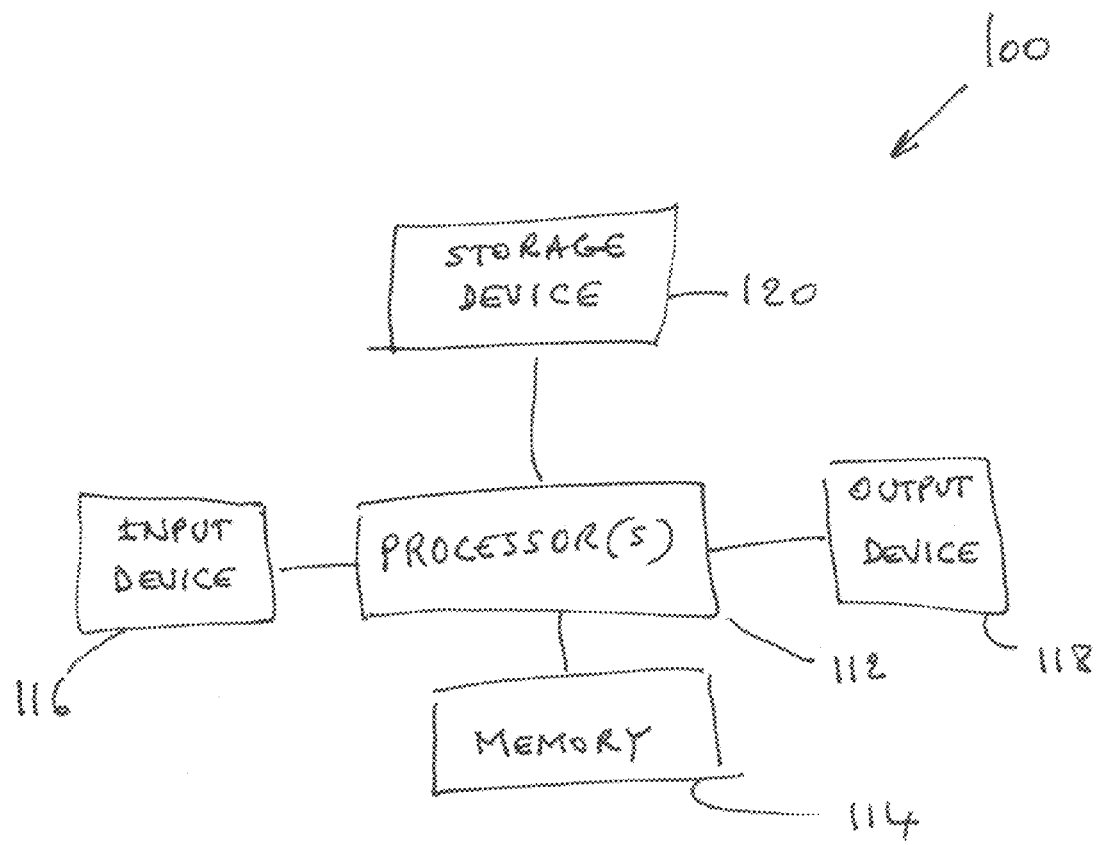
FIG. 12 is a schematic diagram representing a computer system for implementing the methods, according to an embodiment of the present invention.

FIG. 12 is a schematic diagram representing a computer system 100 for implementing the methods, according to an embodiment of the present invention. As shown in FIG. 12, computer system 100 comprises a processor (e.g., one or more processors) 112 and a memory 114 in communication with the processor 112. The computer system 100 may further include an input device 116 for inputting data (such as keyboard, a mouse or the like) and an output device 118 such as a display device for displaying results of the computation. The computer may further include or be in communication with a storage device 120 for storing data such as, but not limited to, a hard-drive, a network attached storage (NAS) device, a storage area network (SAN), etc. It must be appreciated that the term processor is used herein to encompass one or more processors. Where reference is made to a processor that term should be understood to encompass any of these computing arrangements.

As it can be appreciated from the above paragraphs, the system 100 is provided for detecting one or more objects in a three-dimensional point cloud scene. The system 100 includes one or more processors 112 that are configured to: (a) receive a three-dimensional point cloud scene, the three-dimensional point cloud scene comprising a plurality of points; (b) classify at least a portion of the plurality of points in the three-dimensional point cloud into two or more categories by applying a classifying-oriented three-dimensional local descriptor and learning-based classifier; (c) extract from the three-dimensional point cloud scene one or more clusters of points utilizing the two or more categories by applying at least one of segmenting and clustering; and (d) match the extracted clusters with objects within a library by applying a matching-oriented three-dimensional local descriptor.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method of detecting one or more objects in a three-dimensional point cloud scene, the method being implemented by a computer system that includes one or more processors configured to execute computer modules, the method comprising:
   receiving, by one or more processors, a three-dimensional point cloud scene, the three-dimensional point cloud scene comprising a plurality of points;
   classifying, by the one or more processors, at least a portion of the plurality of points in the three-dimensional point cloud into two or more categories by applying a classifying-oriented three-dimensional local descriptor and learning-based classifier;
   extracting, by the one or more processors, from the three-dimensional point cloud scene one or more clusters of points utilizing the two or more categories by applying at least one of segmenting and clustering; and
   matching, by the one or more processors, the extracted clusters with objects within a library by applying a matching-oriented three-dimensional local descriptor.

2. The method according to claim 1, further comprising receiving, by the one or more processors, the objects within the library and training the learning-based classifier to distinguish various objects within the three-dimensional point cloud scene.

3. The method according to claim 1, wherein the learning-based classifier comprises a support vector machine.

4. The method according to claim 1, wherein the classifying-oriented three-dimensional local descriptor comprises a Fast Point Feature Histogram that uses a histogram to encode geometrical properties of a neighborhood of each point by generalizing a mean curvature around each point.

5. The method according to claim 1, wherein the classifying-oriented three-dimensional local descriptor comprises a Fast Point Feature Histogram, the learning-based classifier is a Support Vector Machine, and the Fast Point Feature Histogram feeds positive/negative clusters to the Support Vector Machine to train the Support Vector Machine to distinguish various objects within the three-dimensional point cloud scene.

6. The method according to claim 1, wherein the library includes one or more mesh models of objects, one or more point clouds of the objects, or both.

7. The method according to claim 6, wherein if the library contains one or more mesh models of the objects, converting, by the one or more processors, the one or more mesh models of the objects into point clouds of the objects.

8. The method according to claim 1, further comprising filtering, by the one or more processors, each of the extracted clusters to obtain filtered clusters with desired characteristics and then matching, by the one or more processors, the filtered clusters with the objects within the library by applying the matching-oriented three-dimensional local descriptor.

9. The method according to claim 1, wherein the two or more categories comprise at least two of the following: a plane category, a pipe category, an edge category and a thin pipe category.

10. The method according to claim 1, wherein applying at least one of segmenting and clustering comprises extracting and fitting connected components of the same category and clustering remaining points based on Euclidean distance.

11. The method according to claim 1, wherein segmenting is applied using a min-cut approach.

12. The method according to claim 1, wherein segmenting is applied by iteratively selecting a random unvisited seed point and expanding the seed point to unvisited neighboring points within a given Euclidean distance using a classical Flood-Fill algorithm.

13. The method according to claim 1, wherein clustering is applied by subtracting relatively large clusters from the original point cloud to remove small areas of regular shapes that may lie on a relatively larger part, and clustering remaining points that are believed to be part points.

14. The method according to claim 1, wherein clustering is applied by evaluating a linearity of each cluster by an absolute value of a correlation coefficient in a least square fitting on three-dimensional points of three projections in three orthogonal planes.

15. The method according to claim 1, wherein matching comprises computing all nearest-neighbor correspondences, or pairs of features, with a Nearest Neighbor Distance Ratio (NNDR) value, applying a filtering procedure to look for correspondences that fit a distance constraint, estimating a transformation based on all correspondences, and refining through Gram-Schmidt Orthogonalization.

16. The method according to claim 1, wherein the matching procedure comprises a three-dimensional self-similarity descriptor.

17. A system of detecting one or more objects in a three-dimensional point cloud scene, the system comprising a processor configured to:
- receive a three-dimensional point cloud scene, the three-dimensional point cloud scene comprising a plurality of points;
- classify at least a portion of the plurality of points in the three-dimensional point cloud into two or more categories by applying a classifying-oriented three-dimensional local descriptor and learning-based classifier;
- extract from the three-dimensional point cloud scene one or more clusters of points utilizing the two or more categories by applying at least one of segmenting and clustering; and
- match the extracted clusters with objects within a library by applying a matching-oriented three-dimensional local descriptor.

18. The system according to claim 17, wherein the processor is configured to filter each of the extracted clusters to obtain filtered clusters with desired characteristics and then match the filtered clusters with the objects within the library by applying the matching-oriented three-dimensional local descriptor.

19. The system according to claim 17, wherein at least one of the classifying-oriented three-dimensional local descriptor and the matching-oriented three-dimensional local descriptor comprises a three-dimensional self-similarity descriptor.

20. The system according to claim 17, wherein the two or more categories comprise at least two of the following: a plane category, a pipe category, an edge category and a thin pipe category.

* * * * *